United States Patent
Neubauer et al.

(10) Patent No.: US 10,411,538 B2
(45) Date of Patent: Sep. 10, 2019

(54) EXTERNAL ROTOR OF A DEVICE FOR THE CONTACTLESS TRANSMISSION OF ROTARY MOVEMENTS

(71) Applicant: Mahle International GmbH, Stuttgart (DE)

(72) Inventors: Andreas Neubauer, Weissach im Tal (DE); Thomas Riemay, Korb (DE)

(73) Assignee: Mahle International GmbH (DE)

( * ) Notice: Subject to any disclaimer, the term of this patent is extended or adjusted under 35 U.S.C. 154(b) by 458 days.

(21) Appl. No.: 15/062,033

(22) Filed: Mar. 4, 2016

(65) Prior Publication Data

US 2016/0261156 A1 Sep. 8, 2016

(30) Foreign Application Priority Data

Mar. 5, 2015 (DE) .................. 10 2015 203 995

(51) Int. Cl.
*H02K 1/27* (2006.01)
*H02K 49/10* (2006.01)

(52) U.S. Cl.
CPC ......... *H02K 1/2786* (2013.01); *H02K 49/102* (2013.01)

(58) Field of Classification Search
CPC .... H02K 49/10; H02K 49/102; H02K 49/104; H02K 49/106; H02K 49/108; H02K 1/2786
USPC .................................................. 310/103, 104
See application file for complete search history.

(56) References Cited

U.S. PATENT DOCUMENTS

| 4,782,259 A | 11/1988 | Shikama et al. | |
| 5,280,209 A * | 1/1994 | Leupold | H02K 1/278 310/156.41 |
| 2004/0066107 A1* | 4/2004 | Gery | H02K 49/106 310/103 |
| 2005/0040721 A1* | 2/2005 | Kusase | H02K 1/278 310/156.43 |
| 2010/0314954 A1* | 12/2010 | Araki | H02K 1/2786 310/43 |
| 2011/0241667 A1* | 10/2011 | Blumich | G01N 24/08 324/303 |
| 2014/0333167 A1* | 11/2014 | Akamatsu | H02K 1/2786 310/153 |

FOREIGN PATENT DOCUMENTS

EP 1239572 A2 9/2002

* cited by examiner

*Primary Examiner* — Thomas Truong
(74) *Attorney, Agent, or Firm* — Fishman Stewart PLLC

(57) ABSTRACT

An external rotor of a device for contactless transmission of rotary movements, for example of an electric motor, a magnetic transmission, a generator or a magnetic coupling, may include a plurality of different permanent magnet segments configured ring segment-like that are alternatingly arranged in a closed permanent magnet segment ring. At least one lateral surface of at least one permanent magnet segment of the plurality of permanent magnet segments may deviate from a radial direction. The at least one permanent magnet segment via the at least one lateral surface may be in contact with another permanent magnet segment of the plurality of permanent magnet segments.

18 Claims, 3 Drawing Sheets

EXTERNAL ROTOR OF A DEVICE FOR THE CONTACTLESS TRANSMISSION OF ROTARY MOVEMENTS

CROSS-REFERENCE TO RELATED APPLICATIONS

This application claims priority to German Patent Application No. 10 2015 203 995.1, filed Mar. 5, 2015, the contents of which are hereby incorporated by reference in its entirety.

TECHNICAL FIELD

The present invention relates to an external rotor of a device for the contactless transmission or rotary movements, in particular of an electric motor. The invention, furthermore, relates to an electric motor, a generator or a magnetic coupling with such an external rotor.

BACKGROUND

External rotors for the contactless transmission of rotary movements can be designed for example as couplings, the function of which is based on the effect of a magnetic field; in drive technology, these are called magnetic field couplings. Such magnetic field couplings are employed according to the prior art in order to contactlessly transmit rotational moments across an air gap or through a wall and are therefore often employed in fluid-flow machines such as for example fluid pumps.

From EP 1 239 572 A2 a generic external rotor for the contactless transmission of rotary movements, specifically a magnetic coupling, is known, which comprises two magnetic coupling elements, which are mechanically decoupled from one another through a gap. The two magnetic coupling elements are magnets which are polarised in a segmented manner, which are each attached on the face ends facing one another.

In order to be able to achieve as high as possible an efficiency of such an external rotor it is already known to design permanent magnets of an external rotor in an annular segment form and to arrange these alternatingly in a closed ring in circumferential direction. Because of this it is possible to utilise the complete space that is available in order to place individual permanent magnet segments there. Because of this, a closed annular arch of individual permanent magnet segments can thus be formed. In certain applications it is additionally desirable that the individual permanent magnet segments of the external rotor are embedded into a pocket of the external rotor, which prevents axial shifting or detaching of the permanent magnet segments. Inserting known annular segment-shaped permanent magnet segments in such a pocket of the external rotor however is exclusively possible by axially inserting at least the "keystone", since closed annular arches cannot be otherwise constructed from the individual permanent magnet segments. Alternatively to this, arranging the individual permanent magnet segments in the external rotor is merely possible in a form that is not completely annularly closed.

SUMMARY

The present invention deals with the problem of stating an improved or at least an alternative embodiment for an external rotor of the generic type, which is characterized in particular by a simplified production method and a high efficiency.

According to the invention, this problem is solved through the subject of the independent Claim(s). Advantageous embodiments are subject of the dependent claims.

The present invention is based on the general idea of designing individual ring segment-like permanent magnets in such a manner that these can be alternatingly arranged in a closed ring (permanent magnet segment ring), and a purely radial assembly is also made possible, that is no compulsory axial inserting of at least one "keystone" (last permanent magnet segment) has to take place. To this end, a number of different permanent magnet segments of ring segment-like design is provided, wherein at least one lateral surface of at least one such permanent magnet segment, by way of which the same is in contact with adjacent permanent magnet segments, deviates from a radial direction. Specifically this means for example that individual permanent magnet segments have lateral surfaces which conically taper towards the inside, while other permanent magnet segments have lateral surfaces which conically taper towards the outside. This makes possible a purely radial assembly of the individual permanent magnet segments to form a closed permanent magnet segment ring, wherein the last permanent magnet segment can also be inserted in radial direction, since the same comprises lateral surfaces which conically taper towards the outside and because of this can be inserted wedge-like into the permanent magnet segment ring to be closed with this last permanent magnet segment. Because of this, assembly, in particular, of such a permanent magnet segment ring in a pocket of an external rotor that is closed radially and at the face end in particular can be achieved comparatively easily, wherein because of the shaping of the individual permanent magnet segments according to the invention the annular installation space that is available can be completely occupied with permanent magnet segments, which in turn results in a high efficiency of the external rotor. Alternatively to permanent magnet segments with lateral surfaces which conically taper towards the inside and permanent magnet segments with lateral surfaces which conically taper towards the outside, at least one permanent magnet segment with lateral surfaces running in parallel can also be provided. In this case, the other permanent magnet segments usually have lateral surfaces which conically taper towards the inside, i.e. converging lateral surfaces. Obviously, multiple such permanent magnet segments with lateral surfaces running in parallel can also be provided, which are alternatingly arranged with other permanent magnet segments in the permanent magnet segment ring.

In an advantageous further development of the solution according to the invention, at least a number of first permanent magnet segments of ring segment-like design and at least a number of second permanent magnet segments of ring segment-like design are provided, which are alternating arranged in a closed permanent magnet segment ring. The first permanent magnet segments in this case comprise lateral surfaces which conically taper towards the inside, while the second permanent magnet segments have lateral surfaces which conically taper towards the outside. Because of this, first and second permanent magnet segments can be alternatingly inserted in the external rotor initially, wherein finally a second permanent magnet segment with lateral surfaces which conically taper towards the outside can thus be inserted into the permanent magnet segment ring to be closed and fixed. Such an external rotor can for example comprise three first permanent magnet segments and three second permanent magnet segments.

In an embodiment of the external rotor according to the invention that is alternative to this, a number of third permanent magnet segments of ring segment-like design and a complementary number of fourth permanent magnet segments of ring segment-like design are provided, which are alternatingly arranged in a permanent magnet segment ring. The third and the fourth permanent magnet segments in this case have lateral surfaces which conically taper towards the inside. Additionally, a number of fifth permanent magnet segments of ring segment-like design is now provided, which comprise lateral surfaces which conically taper towards the outside and in each case are arranged between a third and a fourth permanent magnet segment. In this case, the ultimately closed permanent magnet segment ring thus consists of third, fourth and fifth permanent magnet segments, wherein the third and the fourth permanent magnet segments are preferentially designed in the same shape and merely have an inverted polarity. Practically, the fifth permanent magnet segments are designed as transverse magnets and because of this do not generate magnetic field lines running in radial direction, but magnet field lines which substantially run in circumferential direction between two adjacent permanent magnet segments. A radial assembly of the individual permanent magnet segments to form a closed permanent magnet segment ring is also comparatively easy with such third, fourth and fifth permanent magnet segments, provided that as "keystone" a fifth permanent magnet segment with lateral surfaces which conically taper radially to the outside is used. This fifth permanent magnet segment can then be inserted wedge-like in radial direction towards the outside as "keystone" between a third and a fourth permanent magnet segment element. Fixing the individual permanent magnet segments in the external rotor in this case can be effected for example by means of gluing.

In a further alternative embodiment of the external rotor according to the invention, a number of six permanent magnet segments of ring segment-like design and a number of seventh permanent magnet segments of ring segment-like design that is complementary to the former is provided, which in turn are alternatingly arranged in a permanent magnet segment ring. The sixth and seventh permanent magnet segments in this case have lateral surfaces which conically taper towards the outside, wherein additionally a number of eighth permanent magnet segments of ring segment-like design is provided, which have lateral surfaces which conically taper towards the inside and in each case are arranged between a sixth and a seventh permanent magnet segment. Here, three sixth, three seventh as well as eight permanent magnets can form a closed permanent magnet segment ring. Here, the eight permanent magnet segments can likewise in turn be designed as transverse magnets. Such an embodiment of the individual permanent magnet segments also makes possible a comparatively simple radial assembly to form a closed permanent magnet segment ring, without the last permanent magnet segment having to be inserted axially.

Here it is clear that each permanent magnet segment comprises a pole pair with at least one north pole and one south pole. When using so-called transverse magnets, a Halbach magnetization is also possible.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

The drawings show, in each case schematically.

DETAILED DESCRIPTION

Figure 1:
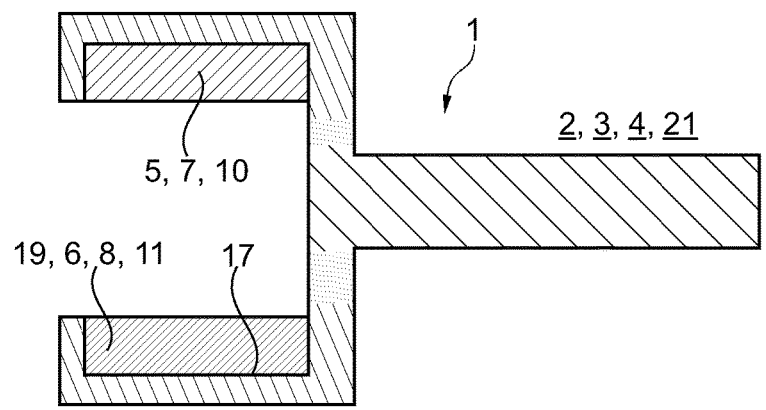
FIG. 1 a longitudinal sectional representation through an external rotor according to the invention with permanent magnet segments arranged therein, FIG. 2 a cross-sectional representation through the external rotor according to the invention with a first embodiment, FIG. 3 a representation as in FIG. 2, however with a second embodiment, FIG. 4 a representation as in FIG. 3, however with modified embodiment, FIG. 5 a cross-sectional representation through the external rotor according to the invention with multiple permanent magnet segments designed as transverse magnets with parallel lateral surfaces, FIG. 6 a cross-sectional representation through the external rotor according to the invention with a permanent magnet segment with parallel lateral surfaces, FIG. 7 a cross-sectional representation through the external rotor according to the invention with multiple permanent magnet segments with parallel surfaces.
Figure 2:
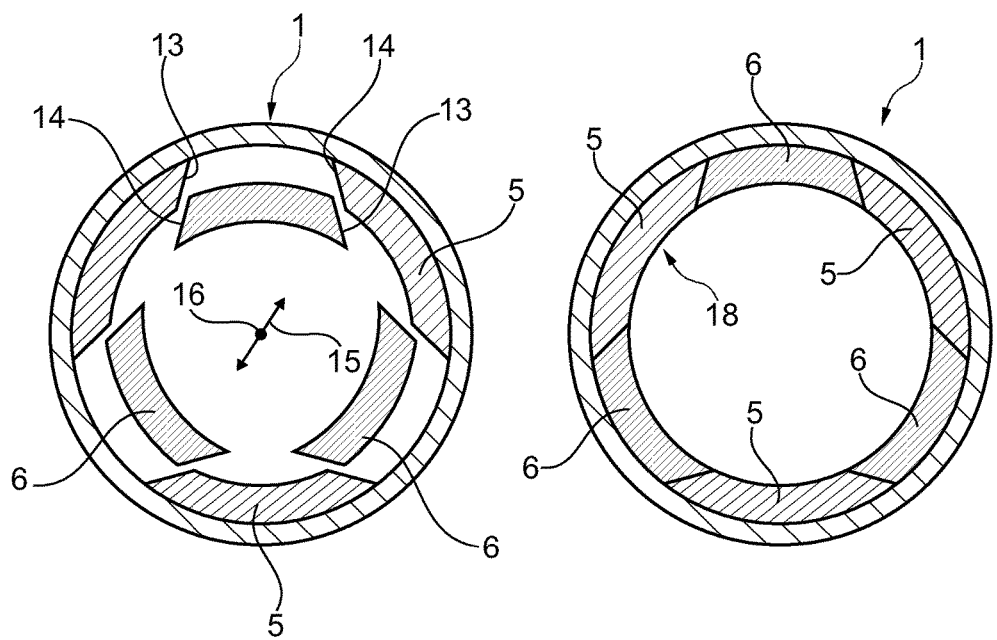
Figure 3:
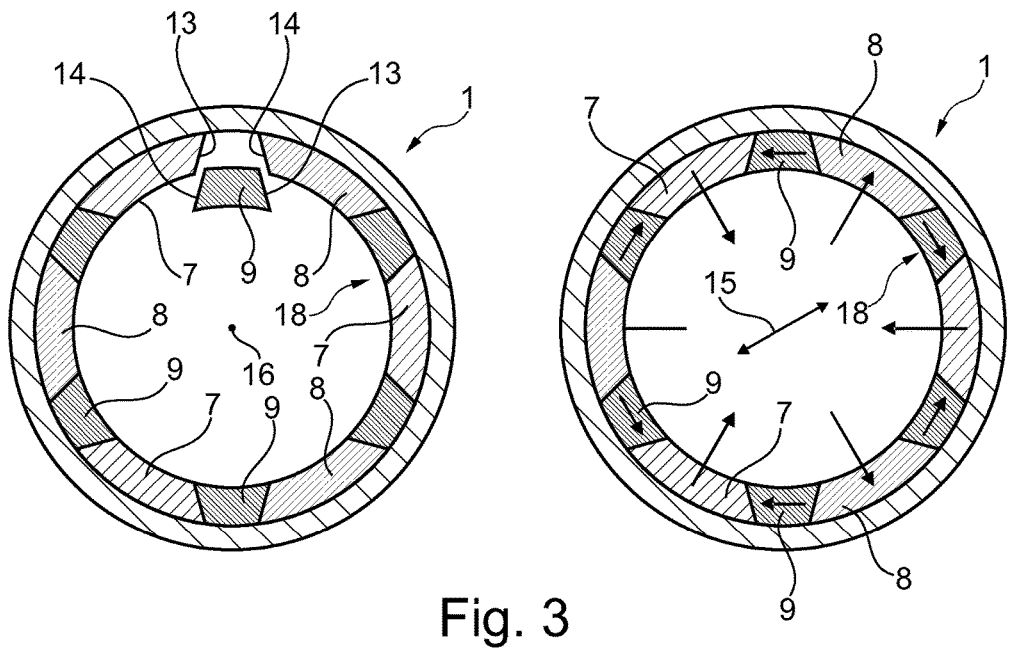
Figure 4:
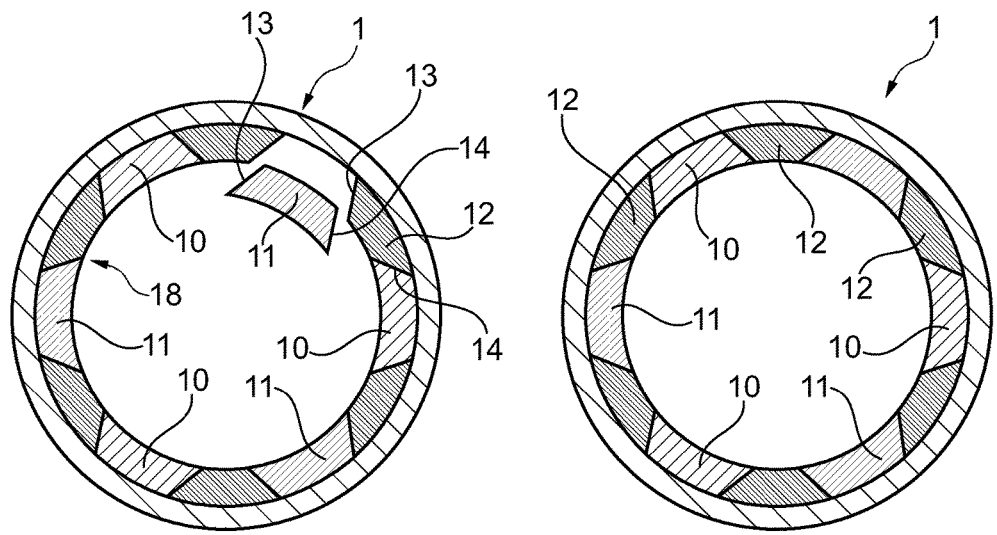

According to FIG. 1, an external rotor 1 according to the invention, which for example can be arranged in an electric motor 2, a generator 3, a magnetic transmission 21 or a magnetic coupling 4 comprises a number of permanent magnet segments 5, 6, 7, 8, 9, 10, 11, 12, 19 of different ring segment-like design, which are alternatingly arranged in a closed permanent magnet segment ring 18 (see also FIGS. 2 to 4). At least one lateral surface 12, 13 of at least one permanent magnet segment 5, 6, 7, 8, 9, 10, 11, 12, 19 by way of which the same is in contact with an adjacent permanent magnet segment 5, 6, 7, 8, 9, 10, 11, 12, 19, deviates from a radial direction 15 in this case. This means that the planes of the lateral surfaces 13, 14 intersect outside the rotor 1 or within the same, however not in the centre 16 or with parallel lateral surfaces 13, 14 not at all.

Now considering the first alternative embodiment, which is shown in FIG. 2, it is evident that the external rotor 1 according to the invention comprises at least a number of first permanent magnet segments 5 of segment-like design and at least a complementary number of second permanent magnet segments 6 or ring segment-like design, which according to the right representation in FIG. 2 are alternatingly arranged in the installed state in a closed permanent magnet segment ring 18. The first permanent magnet segments 5 in this case comprise lateral surfaces 13, 14 which conically taper towards the inside, whereas the second permanent magnet segments 6 have lateral surfaces 13, 14 which conically taper towards the outside. For constructing the permanent magnet segment ring, the first permanent magnet segments 5 are thus initially introduced into the external rotor 1 or a pocket 17 arranged there, in order to subsequently insert the second permanent magnet segments 6 of wedge-like design in the sections that remain vacant. As is already clearly visible from FIGS. 1 and 2, a radial assembly of the permanent magnet segment ring 18 is possible in this case, which would not be possible with ring segment-like permanent magnet segments of purely identical design, which would be arranged in the manner of a closed arch ring.

According to FIG. 2, three first permanent magnet segments 5 and three second permanent magnet segments 6 are provided in this case.

Looking at the alternative embodiment of the external rotor 1 shown according to FIG. 3, a number of third permanent magnet segments 7 of ring segment-like design and a complementary number of fourth permanent magnet segments 8 of ring segment-like design is noticeable, which according to the right representation in FIG. 3 in turn are alternatingly arranged in a permanent magnet segment ring 18 in circumferential direction. Additionally, a number of fifth permanent magnet segments 9 of ring segment-like design is provided, which has lateral surfaces 13, 14 which conically taper towards the outside, and which in each case are arranged between a third and a fourth permanent magnet segment 7, 8. The third and fourth permanent magnet segments 7, 8 by contrast have lateral surfaces 13, 14 which conically taper towards the inside and are additionally designed identical in shape. The fifth permanent magnet segments 9 in this case are designed as transverse magnets and thus do not generate any radial magnetic field lines, but magnetic field lines running in circumferential direction between two adjacent third and fourth permanent magnet segments 7, 8. Because of this, a so-called Halbach magnetization can be achieved in particular. Altogether, three third and three fourth permanent magnet segments 7, 8 each and a total of six fifth permanent magnet segments 9 are provided in total in the external rotor 1 shown according to FIG. 3.

FIG. 4 shows a further possible alternative embodiment of the external rotor 1 according to the invention, with which a number of sixth permanent magnet segments 10 designed of ring segment-like design and a complementary number of seventh permanent magnet segments 11 of ring segment-like design is provided, which in turn are alternatingly arranged in a permanent magnet segment ring 18. Alternatingly, in this case, does not necessarily mean that the sixth and seventh permanent magnet segments 10, 11 have to directly abut one another, but as shown in the present case subject to the intermediate connection of an eight permanent magnet segment 12 of ring segment-like design. The sixth and seventh permanent magnet segments 10, 11 in this case have lateral surfaces 13, 14 which conically taper towards the outside, while the eight permanent magnets 12 of ring segment-like design—as already mentioned, have lateral surfaces 13, 14 which conically taper towards the inside and in this case are likewise designed as transverse magnets.

The sixth and seventh permanent magnet segments 10, 11 in this case are designed identical in shape, wherein altogether three sixth and three seventh permanent magnet segments 10, 11 as well as six eight permanent magnet segments 12 are provided.

Figure 5:
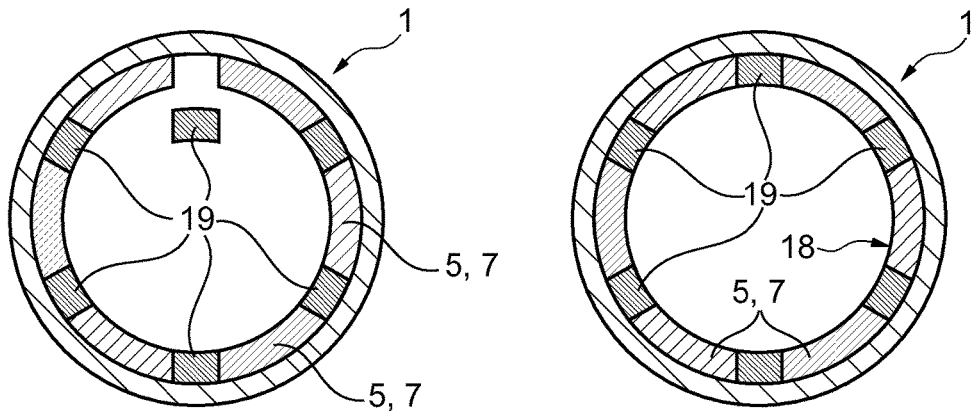
Figure 6:
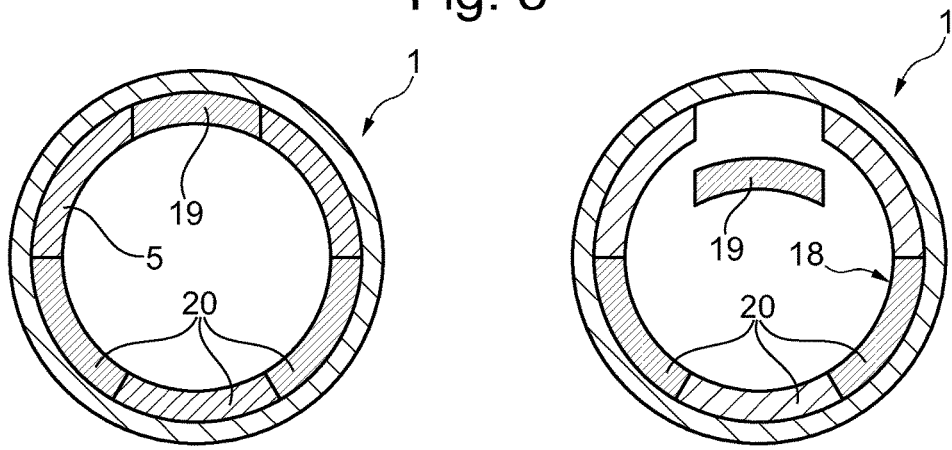
Figure 7:
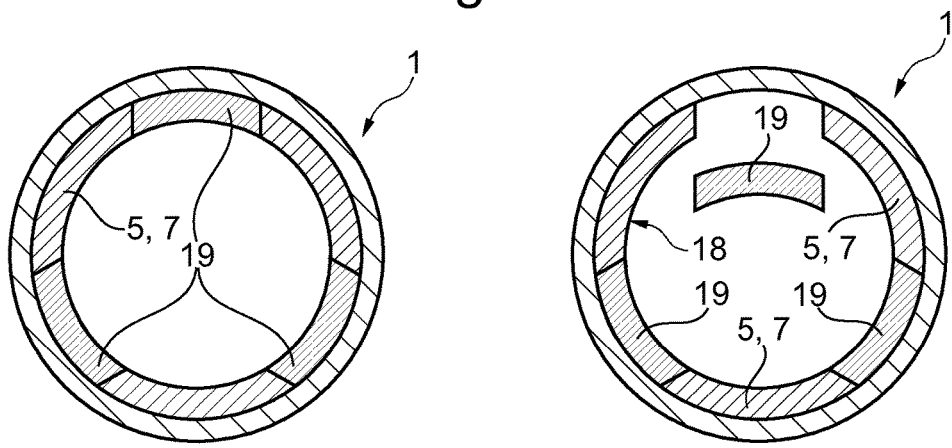

Looking at the external rotors 1 shown in the FIGS. 5 to 7, an embodiment that is alternative to the previous figures is evident, in the case of which at least one permanent magnet segment 19 with lateral surfaces 13, 14 running in parallel can be provided. In this case, the other permanent magnet segments, which for example are designed similar to the first permanent magnet segments 5 or the third permanent magnet segments 7, have lateral surfaces 13, 14 which conically taper towards the inside, i.e. converge. Obviously, multiple such permanent magnet segments 19 with lateral surfaces 13, 14 running in parallel can also be provided, which are arranged in the permanent magnet segment ring 18 alternating with other permanent magnet segments.

In the case of the external rotor 1 according to FIG. 5, the permanent magnet segments 19 are designed as transverse magnets and because of this form a so-called Halbach magnetization. The permanent magnet segments which are alternatingly arranged between the permanent magnet segments 19 are inversely poled here.

In FIG. 6, only a single permanent magnet segment 19 is equipped with parallel lateral surfaces 13, 14, wherein altogether six permanent magnet segments each with alternating polarity are provided. According to the embodiment according to FIG. 6, permanent magnet segments 20, the lateral surfaces 13, 14 of which run in lateral direction 15 and intersect in the centre 16 are also possible.

In FIG. 7, a total of three permanent magnet segments 19 are equipped with parallel lateral surfaces 13, 14 and arranged between three other permanent magnet segments. The permanent magnet segments 19 as well as the three other permanent magnet segments are each designed identical in shape here.

All show embodiments of the external rotor 1 according to the invention have in common that an assembly of the individual permanent magnet segments 5 to 12 and 19 is possible in radial direction, which is of great advantage in particular when the external rotor 1, as shown in FIG. 1, comprises a pocket 17 and because of this engages about the permanent magnet segments 5 to 12 and 19 both on an outside and also on both face ends.

Obviously it is entirely immaterial if the permanent magnet segments 5 to 12 and 19 are magnetised radially, diametrically or any other way provided these are arranged accordingly in the permanent magnet segment ring 18. However, it is obviously also conceivable here that the individual permanent magnet segments 5 to 12, 19 are magnetised even prior to the installation in the external rotor 1, or are magnetised thereafter.

The invention claimed is:

1. An external rotor of a device for contactless transmission of rotary movements, comprising:
   a plurality of different permanent magnet segments configured ring segment-like and alternatingly arranged to define a closed permanent magnet segment ring, wherein the plurality of permanent magnet segments are wedge shaped and have an arc-shaped radially inner side, an arc-shaped radially outer side, opposing axial face ends, and at least one lateral surface deviating from a radial direction, and wherein the at least one lateral surface of adjacent permanent magnet segments of the plurality of permanent magnet segments contact one another;
   wherein the closed permanent magnet segment ring is arranged completely within a pocket of the external rotor such that each of the plurality of permanent magnet segments on the outer radial side and on the opposing axial face ends engage the external rotor.

2. The external rotor according to claim 1,
   wherein the plurality of permanent magnet segments includes a number of first permanent magnet segments configured ring segment-like and a complementary number of second permanent magnet segments configured ring segment-like, which are alternatingly arranged to define the closed permanent magnet segment ring;

wherein the number of first permanent magnet segments have two lateral surfaces conically tapering towards an inside of the closed permanent magnet segment ring; and wherein the number of second permanent magnet segments have two lateral surfaces conically tapering towards an outside of the closed permanent magnet segment ring.

3. The external rotor according to claim 1, wherein the plurality of permanent magnet segments includes a number of third permanent magnet segments configured ring segment-like, a complementary number of fourth permanent magnet segments configured ring segment-like, and a number of fifth permanent magnet segments configured ring segment-like, the number of third permanent magnet segments and the number of forth permanent magnet segments alternatingly arranged with respect to one another with the number of fifth permanent magnet segments respectively arranged therebetween to define the closed permanent magnet segment ring, the number of third permanent magnet segments and the number of fourth permanent magnet segments have two lateral surfaces which conically taper towards an inside of the closed permanent magnet segment ring, and the number of fifth permanent magnet segments have two lateral surfaces which conically taper towards an outside of the closed permanent magnet segment ring.

4. The external rotor according to claim 3, wherein the number of third permanent magnet segments and the number of fourth permanent magnet segments are configured identical in shape.

5. The external rotor according to claim 3, wherein the number of fifth permanent magnet segments are configured as transverse magnets having magnetic field lines running in a circumferential direction between two adjacent permanent magnet segments.

6. The external rotor according to claim 1, wherein the plurality of permanent magnet segments includes a number of sixth permanent magnet segments configured ring segment-like, a number of seventh permanent magnet segments configured ring segment-like, and a number of eighth permanent magnet segments configured ring segment-like, the number of sixth permanent magnet segments and the number of seventh permanent magnet segments alternatingly arranged with respect to one another with the number of eighth permanent magnet segments respectively arranged therebetween to define the closed permanent magnet segment ring, the number of sixth permanent magnet segments and the number of seventh permanent magnet segments have two lateral surfaces which conically taper towards an outside of the closed permanent magnet segment ring, and the number of eighth permanent magnet segments have two lateral surfaces that conically taper towards an inside of the closed permanent magnet segment ring.

7. The external rotor according to claim 6, wherein the number of sixth permanent magnet segments and the number of seventh permanent magnet segments are configured identical in shape.

8. The external rotor according to claim 6, wherein the number of sixth permanent magnet segments includes at least three sixth permanent magnet segments and the number of seventh permanent magnet segments includes at least three seventh permanent magnet segments, and wherein the number of eighth permanent magnet segments includes at least six eighth permanent magnet segments.

9. The external rotor according to the claim 6, wherein the number of eighth permanent magnet segments are configured as transverse magnets having magnetic field lines running in a circumferential direction between two adjacent permanent magnet segments.

10. The external rotor according to claim 1, wherein the at least one lateral surface includes a first lateral surface and a second lateral surface that deviate from the radial direction such that a plane extending along the first lateral surface intersects a plane extending along the second lateral surface at a point other than a center of the closed permanent magnet segment ring.

11. The external rotor according to claim 10, wherein the plane extending along the first lateral surface intersects the plane extending along the second lateral surface one of i) radially inside the closed permanent magnet segment ring other than at the center and ii) radially outside of the closed permanent magnet segment ring.

12. A device configured as an electric motor, a generator or a magnetic coupling, comprising:

an external rotor including a plurality of different permanent magnet segments each configured as a ring segment having a wedge shape with an arc-shaped radially inner side, an arc-shaped radially outer side, opposing axial face ends, and two lateral surfaces deviating from a radial direction such that respective planes of the two lateral surfaces intersect, the plurality of permanent magnet segments alternately arranged to define a closed permanent magnet segment ring;

wherein the two lateral surfaces of adjacent permanent magnet segments of the plurality of permanent magnet segments deviate from the radial direction differently; and wherein the plurality of permanent magnet segments are arranged completely within a tubular-shaped pocket of the external rotor and form the closed permanent magnet segment ring therein such that external rotor engages an outer radial face and opposing axial face ends of the closed permanent magnet segment ring.

13. The device according to claim 12, wherein the external rotor engages about each of the plurality of permanent magnet segments on the outer radial side and on the opposing axial face ends.

14. The device according to claim 12, wherein the plurality of permanent magnet segments includes a number of first permanent magnet segments alternately arranged with a complementary number of second permanent magnet segments to define the closed permanent magnet segment ring; and wherein the number of first permanent magnet segments have a lateral surface conically tapering towards a radial inside of the closed permanent magnet segment ring and the number of second permanent magnet segments have a lateral surface conically tapering towards a radial outside of the closed permanent magnet segment ring.

15. The device according to claim 14, wherein the number of first permanent magnet segments includes at least three first permanent magnet segments and the number of second permanent magnet segments includes at least three second permanent magnet segments.

16. The device according to claim 12, wherein:
the external rotor further includes hollow cylindrical body having a lateral wall, a closed face wall, and an open face end, the lateral wall including a radially inward projecting flange extending circumferentially about the open face end;
the pocket is defined by the closed face wall, the lateral wall, and the flange, the pocket configured to retain the closed permanent magnet segment ring;
the cylindrical body is configured such that the plurality of permanent magnet segments are axially inserted within the cylindrical body such that the plurality of permanent magnet segments can be radially adjusted into the pocket; and
the plurality of permanent magnet segments are arranged within the pocket to form the closed permanent magnet segment ring completely within the pocket.

17. The device according to claim 16, wherein the plurality of permanent magnet segments are configured such that the closed permanent magnet segment ring contacts the lateral wall, the closed face wall, and the flange.

18. An external rotor of a device for contactless transmission of rotary movements, comprising:
a plurality of permanent magnet segments configured ring segment-like;
the plurality of permanent magnet segments including a first group of permanent magnet segments and a complementary second group of permanent magnet segments each having a wedge shape including an arc-shaped radially inner side, an arc-shaped radially outer side, opposing axial face ends, and two lateral surfaces extending transversely to one another;
the plurality of permanent magnet segments further including a third group of permanent magnet segments having an arc-shaped radially inner side, an arc-shaped radially outer side, opposing axial face ends, and two lateral surfaces extending parallel to one another;
the first group of permanent magnet segments, the second group of permanent magnet segments, and the third group of permanent magnet segments arranged to define a closed permanent magnet segment ring disposed completely within a radially inward opening annular pocket of the external rotor;
the first group of permanent magnet segments and the second group of permanent magnet segments alternately arranged with the third group of permanent magnet segments respectively arranged therebetween such that the first group of permanent magnet segments do not contact the second group of permanent magnet segments; and
wherein the two lateral surfaces of the first group of permanent magnet segments respectively extend parallel to a corresponding lateral surface of the two lateral surfaces of a circumferentially adjacent magnet of the second group of permanent magnet segments such that a magnet of the third group of permanent magnet segments is radially insertable therebetween.

* * * * *